United States Patent
Abedini et al.

(10) Patent No.: US 11,477,723 B2
(45) Date of Patent: Oct. 18, 2022

(54) NR RACH MSG2 RESOURCE CONFIGURATION FOR CV2X

(71) Applicant: QUALCOMM Incorporated, San Diego, CA (US)

(72) Inventors: Navid Abedini, Somerset, NJ (US); Zhibin Wu, Sunnyvale, CA (US); Sudhir Kumar Baghel, Hillsborough, NJ (US); Junyi Li, Chester, NJ (US); Kapil Gulati, Dover, DE (US); Libin Jiang, Bridgewater, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 16/279,561

(22) Filed: Feb. 19, 2019

(65) Prior Publication Data
US 2019/0268829 A1 Aug. 29, 2019

Related U.S. Application Data

(60) Provisional application No. 62/634,527, filed on Feb. 23, 2018.

(51) Int. Cl.
 *H04W 48/14* (2009.01)
 *H04W 28/04* (2009.01)
 (Continued)

(52) U.S. Cl.
 CPC ........... *H04W 48/14* (2013.01); *H04W 28/04* (2013.01); *H04W 48/16* (2013.01); *H04W 72/02* (2013.01);
 (Continued)

(58) Field of Classification Search
 CPC ..... H04W 48/14; H04W 74/08; H04W 28/04; H04W 74/0833; H04W 72/02;
 (Continued)

(56) References Cited

U.S. PATENT DOCUMENTS

| | | | |
|---|---|---|---|
| 2016/0242211 A1* | 8/2016 | Chung | H04J 11/0073 |
| 2017/0012686 A1* | 1/2017 | Bengtsson | H04B 7/0684 |

(Continued)

OTHER PUBLICATIONS

Fujitsu: "Discussion on RACH Procedure", 3GPP Draft; R1-1701917 Discussion on RACH Procedure, 3rd Generation Partnership Project (3GPP), Mobile Competence Centre, 650, Route Des Lucioles, F-06921 Sophia-Antipolis Cedex, France, vol. RAN WG1. No. Athens, Greece; Feb. 13, 2017-Feb. 17, 2017, Feb. 12, 2017 (Feb. 12, 2017), pp. 1-7, XP051209079, Retrieved from the Internet: URL: http://www.3gpp.org/ftp/Meetings_3GPP_SYNC/RAN1/Docs [retrieved on Feb. 12, 2017], p. 3, Line 1-Line 21, p. 4, Line 1-Line 15, Paragraph [option2], Paragraph [option4].

(Continued)

*Primary Examiner* — Harry H Kim
(74) *Attorney, Agent, or Firm* — Arent Fox LLP/Qualcomm Incorporated

(57) ABSTRACT

Methods, apparatuses, and computer-readable mediums for wireless communication are disclosed by the present disclosure. In an example, the present disclosure includes receiving, at a second device, a Random Access Channel (RACH) preamble from a first device, the RACH preamble initiates an access procedure between the first device and the second device; selecting, by the second device, a transmission resource associated with a second RACH message based on the RACH preamble; and transmitting, by the second device, the second RACH message on the selected transmission resource to the first device.

60 Claims, 7 Drawing Sheets

(51) Int. Cl.
*H04W 48/16* (2009.01)
*H04W 72/02* (2009.01)
*H04W 72/04* (2009.01)
*H04W 72/00* (2009.01)
*H04W 74/08* (2009.01)
*H04W 4/40* (2018.01)
*H04W 74/00* (2009.01)

(52) U.S. Cl.
CPC ... *H04W 72/0446* (2013.01); *H04W 72/0453* (2013.01); *H04W 74/008* (2013.01); *H04W 74/08* (2013.01); *H04W 74/0833* (2013.01); *H04W 4/40* (2018.02)

(58) Field of Classification Search
CPC .......... H04W 74/008; H04W 72/0446; H04W 48/16; H04W 72/0453; H04W 4/40
See application file for complete search history.

(56) References Cited

U.S. PATENT DOCUMENTS

| 2017/0034767 | A1* | 2/2017 | Griot | H04W 74/0833 |
| 2017/0289964 | A1* | 10/2017 | Lin | H04W 72/1231 |
| 2018/0123650 | A1* | 5/2018 | Yu | H04B 7/0695 |
| 2019/0159216 | A1* | 5/2019 | Sun | H04L 1/1614 |
| 2019/0230706 | A1 | 7/2019 | Li et al. | |
| 2019/0349873 | A1* | 11/2019 | Ohara | H04W 52/36 |
| 2019/0350006 | A1* | 11/2019 | Qian | H04W 74/0833 |

OTHER PUBLICATIONS

Interdigital Communications: "Random Access Aspects for Beam-Based NR Initial Access," 3GPP Draft; R1-1610320, 3rd Generation Partnership Project (3GPP), Mobile Competence Centre; 650, Route Des Lucioles; F-06921, Sophia-Antipolis Cedex; France, vol. RAN WG1, No. Lisbon, Portugal; Oct. 10, 2016-Oct. 14, 2016, Oct. 1, 2016, XP051160018, 5 pages, Retrieved from the Internet: URL:http://www.3gpp.org/ftp/tsg_ran/WG1_RL1/TSGR1_86b/Docs/ [retrieved on Oct. 1, 2016], p. 2/3, Line 6—p. 3/3, Line 10, Paragraph [Observation4].

International Search Report and Written Opinion—PCT/US2019/018796—ISA/EPO—dated May 10, 2019.

Samsung: "Random Access Procedure in NR", 3GPP Draft, R2-167568, Random Access Procedure in NR, 3rd Generation Partnership Project (3GPP), Mobile Competence Centre; 650, Route Des Lucioles; F-06921 Sophia-Antipolis Cedex, France, vol. RAN WG2, Reno. USA; Nov. 14, 2016-Nov. 18, 2016, Nov. 13, 2016 (Nov. 13, 2016), XP051177436, 7 pages, Retrieved from the Internet: URL: http://www.3gpp.org/ftp/Meetings_3GPP_SYNC/RAN2/Docs/ [retrieved on Nov. 13, 2016], Paragraph [02.1], Paragraph [02.2].

* cited by examiner

500

510

Transmit, by a first device, a Random Access Channel (RACH) preamble to a second device, the RACH preamble initiates an access procedure between the first device and the second device

520

Scan, at the first device, for a second RACH message on a transmission resource from the second device based on transmitting the RACH preamble

FIG. 5

NR RACH MSG2 RESOURCE CONFIGURATION FOR CV2X

CLAIM OF PRIORITY

The present application for patent claims priority to U.S. Application No. 62/634,527 entitled "NR RACH MSG2 RESOURCE CONFIGURATION FOR CV2X" filed Feb. 23, 2018, which is assigned to the assignee hereof and hereby expressly incorporated by reference herein.

BACKGROUND

Technical Field

The present disclosure relates generally to communication systems, and more particularly, techniques for cellular vehicle-to-everything (CV2X) in 5G New Radio (NR).

Introduction

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

For example, CV2X communications may include devices discovering and communicating with other nearby devices. Accessing techniques used with various frequency bands in NR may complicate existing access procedures. Thus, improvements in wireless communication operations may be desired.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In accordance with an aspect, the present disclosure includes a method of wireless communications. The described aspects include receiving, at a second device, a Random Access Channel (RACH) preamble from a first device, the RACH preamble initiates an access procedure between the first device and the second device. The described aspects include selecting, by the second device, a transmission resource associated with a second RACH message based on the RACH preamble. The described aspects include transmitting, by the second device, the second RACH message on the selected transmission resource to the first device.

In an aspect, an apparatus for wireless communications may include a memory; and at least one processor coupled with the memory. The processor may be configured to receive, at a second device, a RACH preamble from a first device, the RACH preamble initiates an access procedure between the first device and the second device. The described aspects select, by the second device, a transmission resource associated with a second RACH message based on the RACH preamble. The described aspects transmit, by the second device, the second RACH message on the selected transmission resource to the first device.

In an aspect, an apparatus for wireless communications is described. The described aspects include means for receiving, at a second device, a RACH preamble from a first device, the RACH preamble initiates an access procedure between the first device and the second device. The described aspects include means for selecting, by the second device, a transmission resource associated with a second RACH message based on the RACH preamble. The described aspects include means for transmitting, by the second device, the second RACH message on the selected transmission resource to the first device.

In an aspect, a computer-readable medium storing computer code executable by a processor for wireless communications. The described aspects include one or more codes executable to receive, at a second device, a RACH preamble from a first device, the RACH preamble initiates an access procedure between the first device and the second device. The described aspects select, by the second device, a transmission resource associated with a second RACH message based on the RACH preamble. The described aspects transmit, by the second device, the second RACH message on the selected transmission resource to the first device.

In accordance with an aspect, a method of wireless communications is described. The described aspects include transmitting, by a first device, a RACH preamble to a second device, the RACH preamble initiates an access procedure between the first device and the second device. The described aspects include receiving, at the first device, a second RACH message on a transmission resource from the second device based on transmitting the RACH preamble.

In an aspect, an apparatus for wireless communications may include a memory; and at least one processor coupled with the memory. The processor may be configured to transmit, by a first device, a RACH preamble to a second device, the RACH preamble initiates an access procedure between the first device and the second device. The described aspects receive, at the first device, a second RACH message on a transmission resource from the second device based on transmitting the RACH preamble.

In an aspect, an apparatus for wireless communications is described. The described aspects include means for transmitting, by a first device, a RACH preamble to a second device, the RACH preamble initiates an access procedure between the first device and the second device. The described aspects include receiving, at the first device, a second RACH message on a transmission resource from the second device based on transmitting the RACH preamble.

In an aspect, a computer-readable medium storing computer code executable by a processor for wireless communications. The described aspects include one or more codes executable to transmit, by a first device, a RACH preamble to a second device, the RACH preamble initiates an access procedure between the first device and the second device. The described aspects receive, at the first device, a second RACH message on a transmission resource from the second device based on transmitting the RACH preamble.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

The disclosed aspects will hereinafter be described in conjunction with the appended drawings, provided to illustrate and not to limit the disclosed aspects, wherein like designations denote like elements.

FIG. 5 is a flowchart of an example method of wireless communication by a client UE.

DETAILED DESCRIPTION

Figure 1:
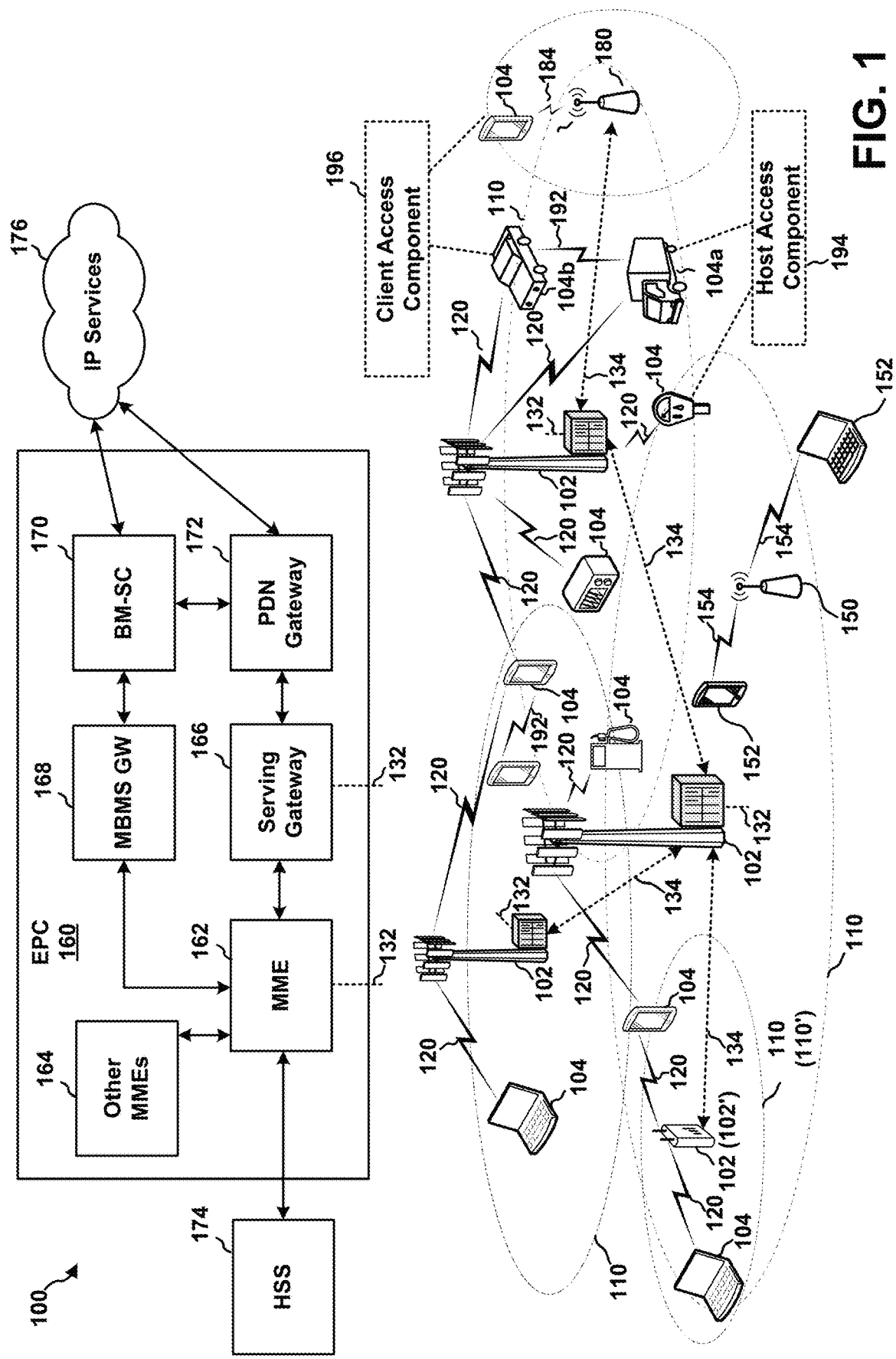
FIG. 1 is a block diagram illustrating an example of a wireless communications system and an access network.

Methods, apparatuses, and computer-readable mediums for wireless communication are disclosed by the present disclosure. In an example, a host device may advertise a service and a client device may indicate interest in the service and initiate a connection with the host device using the preconfigured discovery resources. In particular, a discovery procedure may occur between the host device and the client device in order to establish the connection, and may include a discovery preamble transmitted by the host device and a query transmitted by the interested client device. Subsequently, the host device may transmit a discovery signal only if the host device receives a query in response to the discovery preamble.

Accordingly, upon successful completion of the discovery procedure, the client device "discovers" the host device, and may initiate an access procedure with the host device by transmitting a Random Access Channel (RACH) preamble. Upon reception of the RACH preamble, the host device may transmit a second RACH message (e.g., RACH MSG2). Typically, the second RACH message is used to provide at least one or more of a transmit timing reference for the client device (e.g., timing advance), an identifier (ID) to resolve any contentions among multiple access procedure initiating devices (e.g., similar to the client device), and resource configurations for any subsequent communications between the host device and the client device. In some instances, during earlier signaling (e.g., in master information block (MIB)/system information block (SIB)/remaining minimum system information (RMSI) communicated during the access procedure), a random access response (RAR) window may be configured. Furthermore, a device transmitting the RACH preamble may scan for a signal (e.g., a control channel for the second RACH message, such as RACH MSG 2) within the configured resources corresponding to the RAR.

In an aspect, the present disclosure provides example configurations of selecting a transmission resource and transmitting the second RACH message and techniques for reducing the overhead associated with the access procedure. Multiple discovery devices (e.g., the host devices) may be active within the same set of resources, and, as such, coordination is needed to reduce the likelihood of collisions. Further, the client device may need to include additional information (e.g., related to the scheduling and/or available resources of the client device) in the RACH preamble.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium. Computer-readable media includes computer storage media. Storage media may be any available media that may be accessed by a computer. By way of example, and not limitation, such computer-readable media may comprise a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that may be used to store computer executable code in the form of instructions or data structures that may be accessed by a computer.

FIG. 1 is a diagram illustrating an example of a wireless communications system and an access network 100. The wireless communications system (also referred to as a wireless wide area network (WWAN)) includes base stations 102, UEs 104, and an Evolved Packet Core (EPC) 160. Although an EPC 160 is illustrated, the wireless communications system may include a different core network, such as a 5G Core (5GC). The base stations 102 may include macro cells (high power cellular base station) and/or small cell base stations (low power cellular base station). The UEs 104 may include host UEs 104a that advertise services on the pre-configured discovery resources and client UE 104b that respond to the host UEs 104a.

The base stations 102 (collectively referred to as Evolved Universal Mobile Telecommunications System (UMTS) Terrestrial Radio Access Network (E-UTRAN)) interface with the EPC 160 and/or the 5GC through backhaul links 132 (e.g., S1 interface). In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160 and/or the 5GC) with each other over backhaul links 134 (e.g., X2 interface). The backhaul links 134 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell base station 102' may have a coverage area 110' that overlaps the coverage area 110 of one or more macro cell base stations 102. A network that includes both small cell base stations and macro cell base stations may be known as a heterogeneous network. A heterogeneous network may also include Home Evolved Node Base Stations (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100 MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or less carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 192. The D2D communication link 192 may use the DL/UL WWAN spectrum. The D2D communication link 192 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, FlashLinQ, WiMedia, Bluetooth, ZigBee, Wi-Fi based on the IEEE 802.11 standard, LTE, or NR.

The wireless communications system may further include a Wi-Fi access point (AP) 150 in communication with Wi-Fi stations (STAs) 152 via communication links 154 in a 5 GHz unlicensed frequency spectrum. When communicating in an unlicensed frequency spectrum, the STAs 152/AP 150 may perform a clear channel assessment (CCA) prior to communicating in order to determine whether the channel is available.

The small cell base station 102' may operate in a licensed and/or an unlicensed frequency spectrum. When operating in an unlicensed frequency spectrum, the small cell base station 102' may employ NR and use the same 5 GHz unlicensed frequency spectrum as used by the Wi-Fi AP 150. The small cell base station 102', employing NR in an unlicensed frequency spectrum, may boost coverage to and/or increase capacity of the access network.

A gNodeB (gNB) 180 and/or one or more UEs 104 may operate in millimeter wave (mmW) frequencies and/or near mmW frequencies in communication with the UE 104. When the gNB 180 operates in mmW or near mmW frequencies, the gNB 180 may be referred to as an mmW base station. Extremely high frequency (EHF) is part of the RF in the electromagnetic spectrum. EHF has a range of 30 GHz to 300 GHz and a wavelength between 1 millimeter and 10 millimeters. Radio waves in the band may be referred to as a millimeter wave. Near mmW may extend down to a frequency of 3 GHz with a wavelength of 100 millimeters. The super high frequency (SHF) band extends between 3 GHz and 30 GHz, also referred to as centimeter wave. Communications using the mmW/near mmW radio frequency band has extremely high path loss and a short range. In an aspect, a gNB 180 operating using mmW may utilize beamforming 184 with the UE 104 to compensate for the extremely high path loss and short range. Additionally, UEs 104 performing D2D communications may operate using mmW and may also utilize beamforming 184.

The EPC 160 and/or the 5GC may include a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160 and/or the 5GC. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The base station may also be referred to as a gNB, Node B, evolved Node B (eNB), an access point, a base transceiver station, a radio base station, a radio transceiver, a transceiver function, a basic service set (BSS), an extended service set (ESS), or some other suitable terminology. The base station 102 provides an access point to the EPC 160 and/or the 5GC for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

In certain aspects, one or more UEs 104 may be configured for CV2X communications between UEs 104. The UEs 104 may include various devices related to vehicles and transportation. For example, the UEs 104 may include vehicles, devices within vehicles, and transportation infrastructure such as roadside devices, tolling stations, fuel supplies, or any other device that that may communicate with a vehicle. A UE 104 may act as either a host device or a client device for CV2X communication. A host UE 104a may include a host access component 194 for advertising CV2X services supported by the host UE 104. A client UE 104b may include a client access component 196 for discovering CV2X services supported by the host UE 104a and initiating an access procedure with the host UE 104. Moreover, a UE 104 may act as both a host and a client. For example, a vehicle may act as a host to provide speed and braking updates to surrounding vehicles and act as a client to communicate with a tolling station. Accordingly, a single UE 104 may include both a host access component 194 and a client access component 196. Further details of the host access component 194 and the client access component 196 are illustrated in FIG. 6 and FIG. 7.

Figure 6:
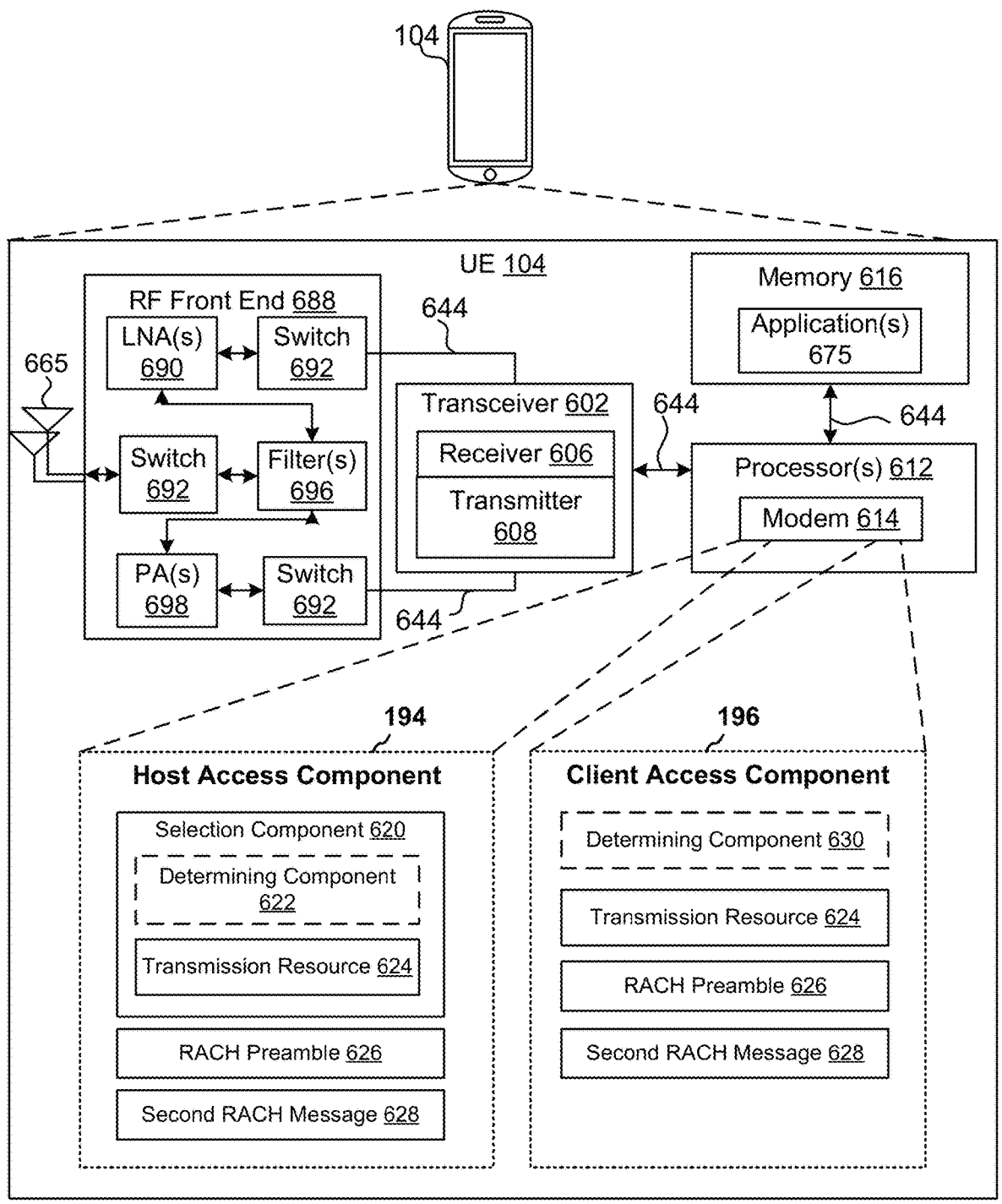
FIG. 6 is a schematic diagram of example components of the UE of FIG. 1.
Figure 7:
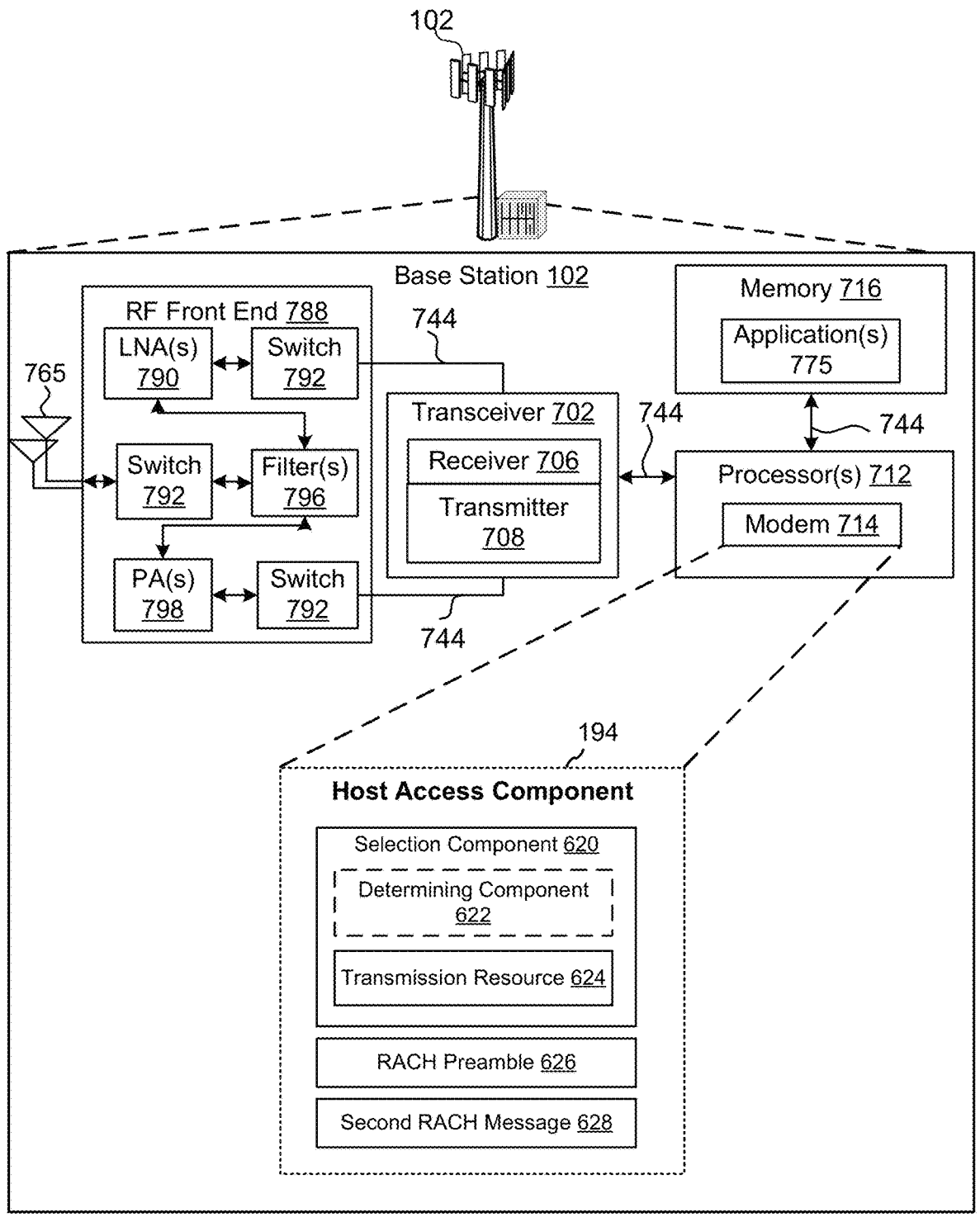
FIG. 7 is a schematic diagram of example components of the base station of FIG. 1.

Referring to FIG. 6 and FIG. 7, the host access component 194 may configure the transceiver 602 and/or antenna(s) 665 to receive a Random Access Channel (RACH) preamble 626 from the client UE 104b. For example, the RACH preamble 626 initiates an access procedure between the host UE 104a and the client UE 104b. The host access component 194 may include a selection component 620 for selecting a transmission resource 624 associated with a second RACH message 628 based on the RACH preamble 626.

In an aspect, the host UE 104a and/or the host access component 194 may configure a transceiver 602 and/or antenna(s) 665 to transmit the second RACH message 628 on the selected transmission resource 624 to the client UE 104b.

In an aspect, the client access component 196, shown in FIG. 6, may configure the transceiver 602 and/or antenna(s) 665 to transmit a RACH preamble 626 to the host UE 104a. For example, the RACH preamble 626 initiates an access procedure between the host UE 104a and the client UE 104b.

In an aspect, the client UE 104b and/or the client access component 194 may configure the transceiver 602 and/or antenna(s) 665 to receive a second RACH message 628 on a transmission resource 624 from the host UE 104a based on transmitting the RACH preamble 626.

In mmW communication systems (e.g., access network 100), a line of sight (LOS) may be needed between a transmitting device (e.g., base station 102) and a receiving device (e.g., UE 104), or between two UEs 104. Frequency is very high in mmW communication systems which means that beam widths are very small, as the beam widths are inversely proportional to the frequency of the waves or carriers transmitted by an antenna of the transmitting device. Beam widths used in mmW communications are often termed as "pencil beams." The small wavelengths may result in many objects or materials acting as obstacles including even oxygen molecules. Therefore, LOS between the transmitter and receiver may be required unless a reflected path is strong enough to transmit data. Further, in some examples, base stations may track UEs 104 to focus beams for communication.

During LOS situations, tracking of the UE 104 may be performed by the base station 102 or another UE 104 by focusing a beam onto the tracked UE 104. However, if the receiving UE 104 is in a Non-Line of Sight (NLOS) position, then a transmitter of the base station 102 may need to search for a strong reflected path which is not always available. An example of a UE 104 being in a NLOS position may include a first UE 104 located within a vehicle. When the first UE 104 is located within the vehicle, a base station 102 may have difficulty retaining LOS and the difficulty of retaining LOS may further increase when the vehicle is moving.

Further, compared to lower frequency communication systems, a distance between base stations 102 in a mmW communication system may be very short (e.g., 150-200 meters between gNBs). The short distances may result in a short amount of time required for a first handover between base stations 102. The short distance and the fast handovers may cause difficulty to the base station 102 in maintaining a LOS beam on a UE 104 when the UE 104 is, for example, located within a vehicle as even small obstacles like a user's finger on the UE 104 or the vehicle windows or windshield may act as obstacles to maintaining the LOS.

Figure 2:
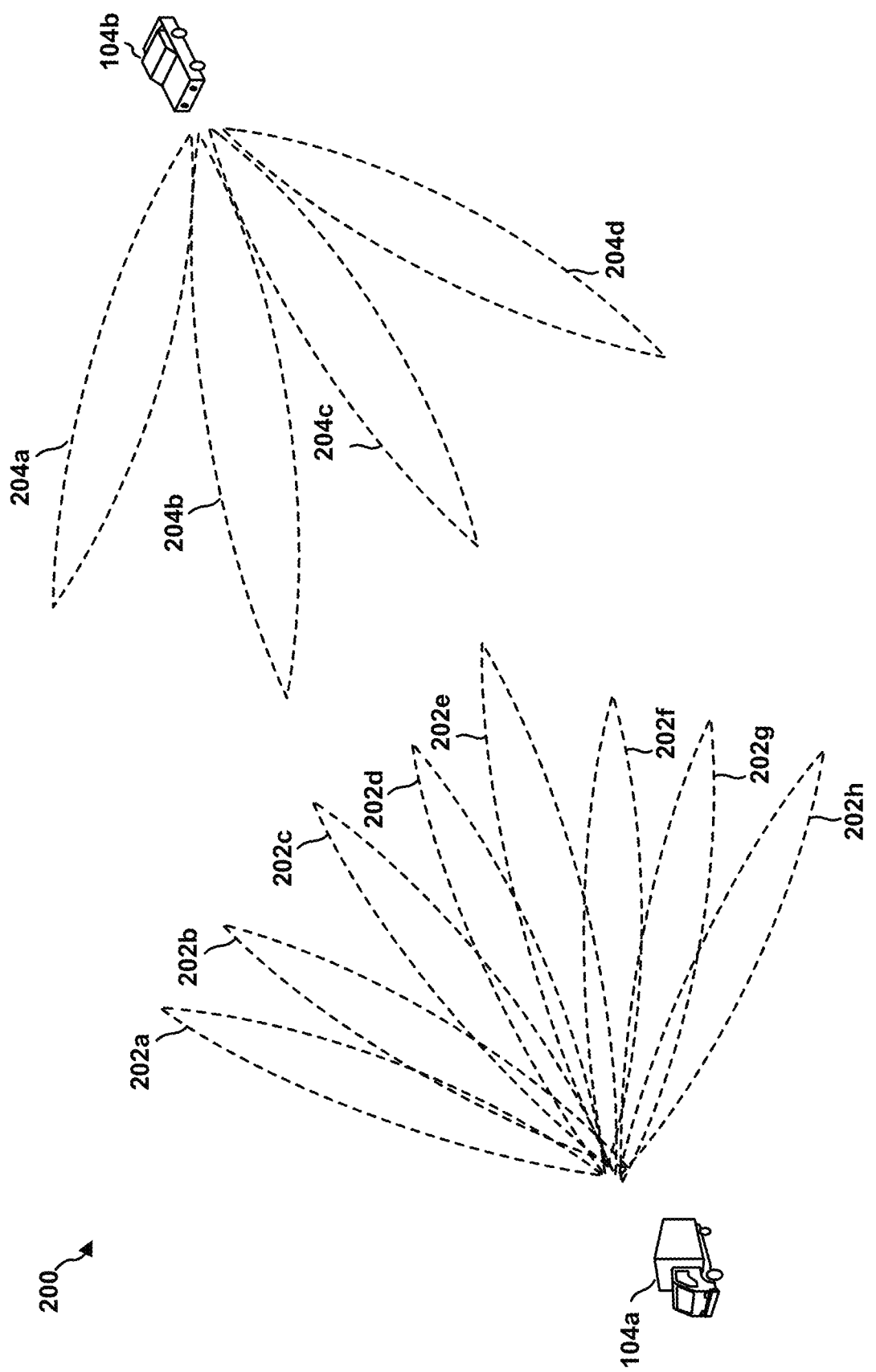
FIG. 2 is a block diagram of example UEs communicating using beamforming.

FIG. 2 is a diagram 200 illustrating a host UE 104a in communication with a client UE 104b. Referring to FIG. 2, the host UE 104a may transmit one or more beams 202a, 202b, 202c, 202d, 202e, 202f, 202g, and/or 202h to the client UE 104b, where the beams may be in one or more directions. The client UE 104b may receive the one or more beams 202a-202h in the same direction as transmitted by the host UE 104a or in another direction due to reflection. The client UE 104b may also transmit one or more beams 204a, 204b, 204c, and/or 204d to the host UE 104a, where the beams may be in one or more directions. The host UE 104a may receive the one or more beams 204a-204d in the same direction as transmitted by the client UE 104b or in another direction due to reflection. The host UE 104a and/or the client UE 104b may perform beam training to determine the best beams for each of the host UE 104a/the client UE 104b to transmit/receive. For example, by providing feedback regarding a strongest beam.

The use of beamforming may impact discovery signals for CV2X communication. In some conventional D2D systems, discovery signals are broadcast by a host device to allow other devices to discover services offered by the host device. When beamforming is used to transmit a discovery signal, devices that are not positioned directly within the beam may not receive the signal. In an aspect, multiple transmissions of a discovery signal may be used to perform beam sweeping by transmitting the discovery signal in different directions. The multiple transmissions, however, may increase resource usage for the discovery signal.

Figure 3:
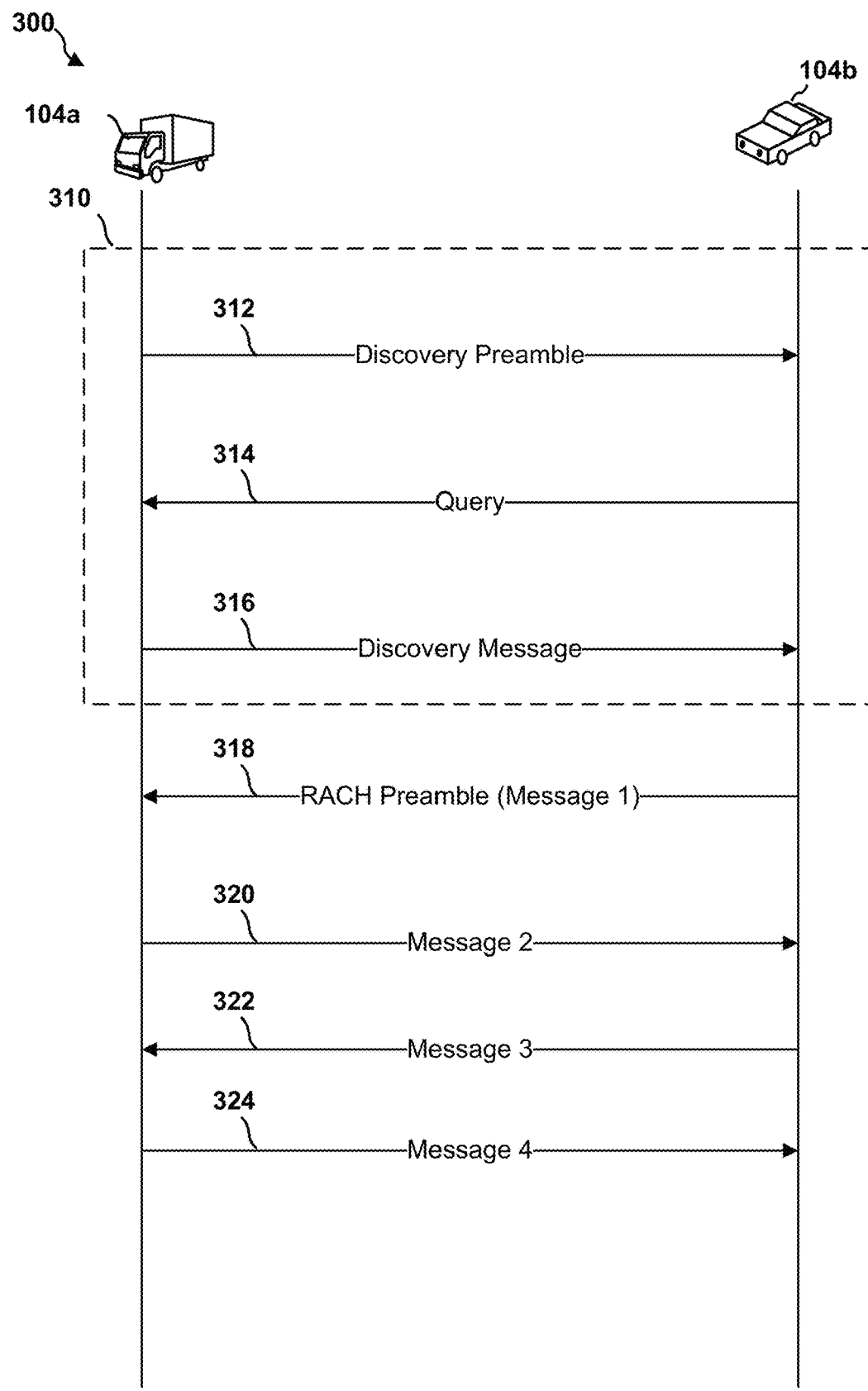
FIG. 3 is a message diagram showing an example of discovery and connection setup between UEs.

FIG. 3 is a message diagram 300 illustrating example signals that may be used for discovery and connection establishment between the host UE 104a and the client UE 104b. Although the illustrated example shows a host UE 104a, in an aspect, a base station 102 may be a host and perform the actions of a host UE 104a as described below. In an aspect, one or more discovery signals may utilize preconfigured discovery resources 310. In a CV2X system, a host UE 104a may not have information regarding the other UEs 104 with which the host UE 104a may want to communicate. By using the preconfigured discovery resources 310, the UEs 104 may limit a search space for discovering other UEs 104 and reduce overhead associated with discovery signals. Further, the discovery signals may reduce overhead by limiting discovery signal transmission unless a host UE 104 receives an indication that a device (e.g., a client UE 104b) is present that is interested in receiving the discovery signal. The discovery signals utilizing the preconfigured discovery resource 310 may include a discovery preamble 312, a query 314, and a discovery message 316.

The discovery preamble 312 may be a transmission from a host UE 104a indicating that the host UE 104a is capable of communicating (e.g., offering a service). For example, the discovery preamble 312 may be one predefined sequence selected from a set of predefined sequences. The selection of the predefined sequence may convey a limited amount of information. For example, the discovery preamble 312 may be selected based on a type of the host UE 104a or a type of service offered by the host UE 104a. As discussed in further detail below, the host UE 104a may transmit the discovery preamble 312 using discovery preamble resources within the preconfigured discovery resources 310. The host UE 104a may select which beams to use for the discovery preamble to attempt to reach potentially interested devices (e.g., one or more client UEs 104b).

The query 314 may be a transmission from a client UE 104b indicating that the client UE 104b is interested in obtaining further information from the host UE 104a. For example, the query 314 may be a preamble or other defined sequence transmitted by the client UE 104b on query resources corresponding to the discovery preamble resources. The client UE 104b may transmit the query 314 on the corresponding query resources upon receiving a discovery preamble in which the client UE 104b is interested. For example, the client UE 104b may transmit the query 314 in response to one or more preambles indicating certain types of devices or services. The client UE 104b may use beamforming for the query 314 based on the received discovery preamble 312 (e.g., using channel estimation and beam training). The host UE 104a may listen for queries 314 on the corresponding query resources.

The discovery message 316 may be a transmission from the host UE 104a providing information regarding one or more services offered by the host UE 104a. The host UE 104a may transmit the discovery message 316 in response to receiving the query 314. The discovery message 316 may include more information than the discovery preamble 312 and may be transmitted using beamforming based on the query 314. For example, the discovery message 316 may include details regarding the service offered by the host UE 104a. By transmitting the larger portion of the discovery information in the discovery message 316 only in response to the query 314, the host UE 104a may limit the discovery resources used. In an aspect, resources designated for transmission of a discovery message 316 may be repurposed (e.g., used for data for an existing connection) when the discovery message 316 is not transmitted. Additionally, since beamforming of the discovery message 316 may be based on the query 314, the host UE 104a may avoid repetitions of the discovery message 316 on multiple beams, further reducing the resources used for discovery.

The RACH preamble 318 may be a transmission from the client UE 104b seeking to establish communications with the host UE 104a. The RACH preamble 318 may also be referred to as a RACH message 1 and may perform a similar role as a conventional RACH message 1. The RACH preamble 318, however, may be transmitted on the preconfigured discovery resources 310 rather than a dedicated RACH physical channel. As discussed in further detail below, the resources defined for the RACH preamble 318 may also be repurposed when the RACH preamble 318 is not transmitted.

The host UE 104a and client UE 104b may complete a RACH procedure (i.e., an access procedure) based on the information obtained from the discovery procedure discussed above. Alternatively, a CV2X RACH procedure may follow other discovery procedures. The RACH procedure may include the RACH preamble 318 (RACH Message 1), RACH message 2 320, RACH message 3 322, and RACH message 4 324.

RACH message 2 320 may be transmitted by the host UE 104a in response to the RACH preamble 318 to indicate resources to be used by the client UE 104b for sending RACH message 3 322 and for receiving RACH message 4 324. RACH message 3 322 may be transmitted by the client UE 104b and may include a control channel and a data channel providing identification information for the client UE 104*b*. RACH message 4 424 may set up a radio resource control (RRC) connection between the host UE 104*a* and the client UE 104*b* that may be used for further communications.

Figure 4:
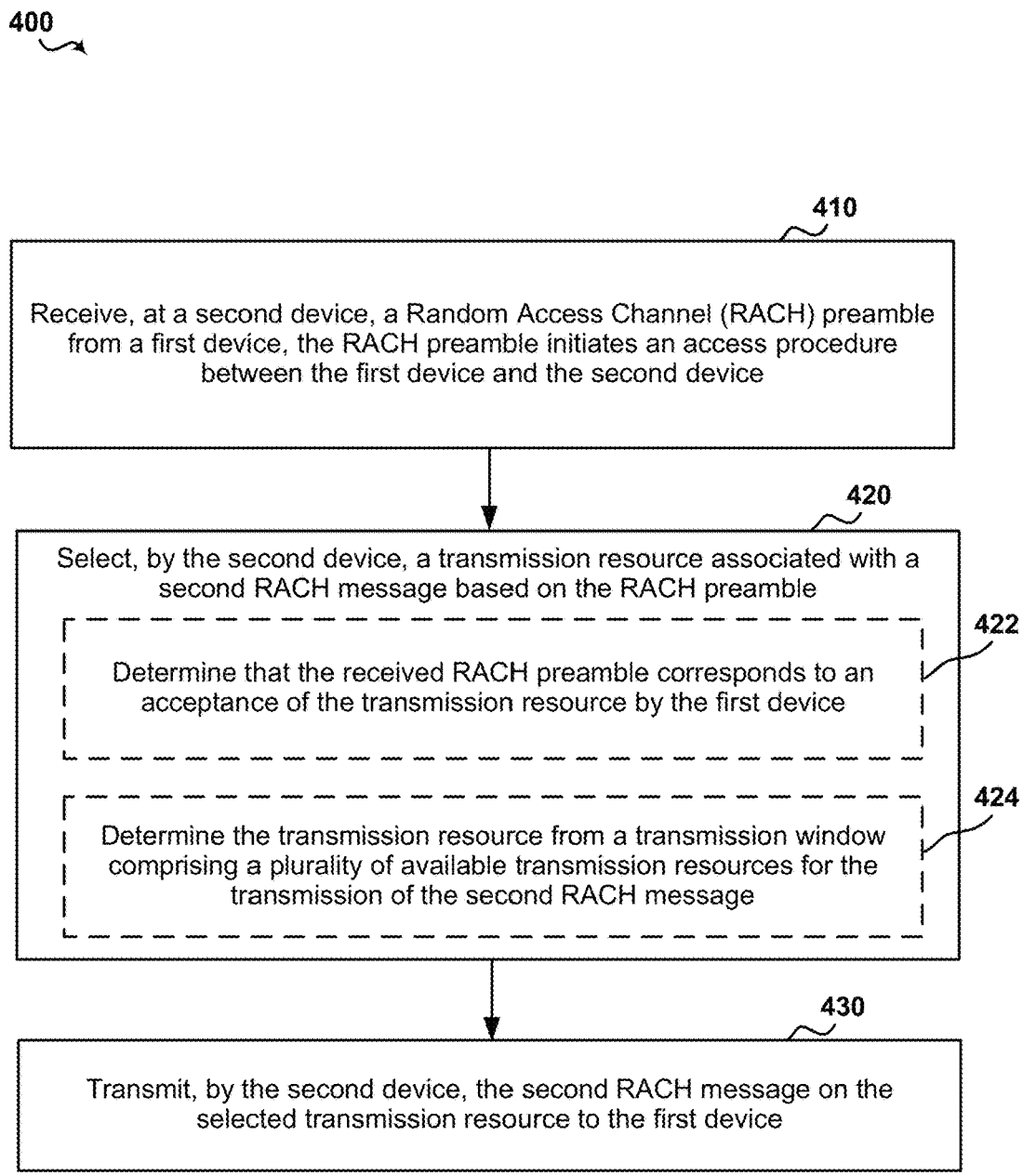
FIG. 4 is a flowchart of an example method of wireless communication by a host UE or base station.

FIG. 4 is a flowchart of a method 400 of wireless communication for a host UE 104*a* or base station 102 in a CV2X system. The method 400 may be performed by an apparatus such as the host access component 194 in conjunction with the processor 612 of the host UE 104*a* or processor 712 of the base station 102. Optional blocks are shown in dashed lines.

At block 410, the method 400 may include receiving, at a second device, a Random Access Channel (RACH) preamble from a first device, the RACH preamble initiates an access procedure between the first device and the second device. In an aspect, for example, the host access component 194 may execute the transceiver 602 to receive a RACH preamble 626 from the client device 104*b*. For example, the RACH preamble 626 initiates an access procedure between the client UE 104*b* and the host UE 104*a*.

At block 420, the method 400 may include selecting, by the second device, a transmission resource associated with a second RACH message based on the RACH preamble. In an aspect, for example, the host access component 194 may execute selection component 620 to select a transmission resource 624 associated with a second RACH message 628 based on the RACH preamble 626.

In an aspect, the block 420 may include the optional sub-block 422, which may include determining that the received RACH preamble 626 corresponds to an acceptance of the transmission resource 624 by the first device. In an aspect, for example, the host access component 194 may execute determining component 622 to determine that the received RACH preamble 626 corresponds to an acceptance of the transmission resource 624 by the client UE 104*b*.

In an example, the host access component 194 may execute the transceiver 602 to transmit a discovery signal during a discovery procedure to the client UE 104*b*, the discovery signal including an indication of the transmission resource 624 associated with the second RACH message 628. Accordingly, the host access component 194 may execute the transceiver 602 to receive the RACH preamble 626 in response to transmitting the discovery signal. In another example, the host access component 194 may execute determining component 622 to determine that the received RACH preamble 626 corresponds to the acceptance of the transmission resource 624 by the client UE 104*b* based on an out-of-band control network configuration such as a preconfigured network setting.

In an aspect, the block 420 may include the optional sub-block 424, which may include determining the transmission resource 624 from a transmission window comprising a plurality of available transmission resources for the transmission of the second RACH message 628. In an aspect, for example, the host access component 194 may execute determining component 622 to determine the transmission resource 624 from a transmission window comprising a plurality of available transmission resources for the transmission of the second RACH message 628.

In an example, the host access component 194 may execute determining component 622 to determine the transmission resource 624 from the transmission window based on a transmission schedule for subsequent transmissions by the host UE 104*a*. The transmission schedule for subsequent transmissions by the host UE 104*a* may include at least one or both of subsequent RACH messages and subsequent non-RACH messages.

In a further example, the RACH preamble 626 may include an indication of a transmission resource selection from the plurality of available transmission resources of the transmission window.

In a further example, the host access component 194 may execute transceiver 602 to receive, at the host UE 104*a*, a transmission resource selection from the client UE 104*b*. The transmission resource selection (e.g., the preferred color of the client UE 104*b*) is selected from a system-wide resource partitioning of a plurality of schedules (e.g., coloring scheme) corresponding to a plurality of client devices. Further, at least one of the RACH preamble 626 or a query message may include the transmission resource selection, the query message being received during a discovery procedure between the client UE 104*b* and the host UE 104*a*. Additionally, the host access component 194 may execute determining component 622 to select determining whether to use the transmission resource selection or another of the plurality of available transmission resources of the transmission window for the transmission of the second RACH message 628 based at least on one or more transmission parameters.

In a further example, the host access component 194 may execute transceiver 602 to receive a passive indication (e.g., a "don't care" indication establishing that the client UE 104*b* does not have a specific choice for the transmission resource 624) from the client UE 104*b*. The passive indication identifying availability of the client UE 104*b* to receive the second RACH message 628 on any of the plurality of transmission resources of the transmission window. The at least one of the RACH preamble 626 or a query message may include the passive indication, the query message being received during a discovery procedure between the client UE 104*b* and the host UE 104*a*.

In a further example, the host access component 194 may execute transceiver 602 to transmit a discovery signal during a discovery procedure to the client UE 104*b*. The discovery signal including an indication of the transmission window comprising the plurality of available transmission resources for the transmission of the second RACH message 628. Accordingly, the host access component 194 may execute the transceiver 602 to receive the RACH preamble 626 in response to transmitting the discovery signal. In another example, the host access component 194 may execute determining component 622 to determine the transmission resource 624 from a transmission window based on an out-of-band control network configuration such as a preconfigured network setting.

In a further example, the transmission resource 624 corresponds to at least one of a transmission resource number (RN) or a transmission offset time slot. Regarding the transmission offset time slot, the client UE 104*b* may be configured to wait a specific period of time corresponding to the transmission offset time slot before receiving the second RACH message 628.

At block 430, the method 400 may include transmitting, by the second device, the second RACH message on the selected transmission resource to the first device. In an aspect, for example, the host access component 194 may execute transceiver 602 to transmit the second RACH message 628 on the selected transmission resource 624 to the client UE 104*b*. Additionally, in an example, the second RACH message 628 may include at least one of a transmit timing reference for the client UE 104*b*, an identifier (ID) for resolving any contentions between multiple remote devices, and resource configurations for one or more subsequent communications.

FIG. 5 is a flowchart of a method 500 of wireless communication for a client UE 104*b* in a CV2X system. The method 500 may be performed by an apparatus such as the client access component 196 of the client UE 104*b*. Optional blocks are shown in dashed lines.

In block 510, the method 500 may include transmitting, by a first device, a Random Access Channel (RACH) preamble to a second device, the RACH preamble initiates an access procedure between the first device and the second device. In an aspect, for example, the host access component 194 may execute transceiver 602 to transmit a RACH preamble 626 to a host UE 104*a*, the RACH preamble 626 initiates an access procedure between the client UE 104*b* and the host UE 104*a*.

In block 520, the method 500 may include scanning, at the first device, for a second RACH message on a transmission resource from the second device based on transmitting the RACH preamble. In an aspect, for example, client UE 104*b* and/or transceiver 602 may be configured to scan for a second RACH message 628 on a transmission resource 624 from the host UE 104*a* based on transmitting the RACH preamble 626.

In an example, the client access component 196 may execute determining component 630 to determine whether the transmission resource 624 is available for the reception of the second RACH message 628 from the host UE 104*a*. Accordingly, the client access component 194 may execute transceiver 602 to transmit the RACH preamble 626 based on a determination that the transmission resource 624 is available for the reception of the second RACH message 628 from the host UE 104*a*. The RACH preamble 626 may correspond an acceptance of the transmission resource 624 by the client UE 104*b*.

Further, the client access component 196 may execute transceiver 602 to receive a discovery signal during a discovery procedure from the host UE 104*a*. The discovery signal may include an indication of the transmission resource 624 associated with the second RACH message 628. Accordingly, the client access component 196 may execute transceiver 602 to transmit the RACH preamble 626 in response to receiving the discovery signal. In another aspect, the client access component 196 may execute determining component 630 to determine whether the transmission resource 624 is available for the reception of the second RACH message 628 from the host UE 104*a* based on an out-of-band control network configuration such as a preconfigured network setting.

In a further example, the transmission resource 624 may correspond to one of a plurality of available transmission resource 624*s* of a transmission window for the reception of the second RACH message 628 from the host UE 104*a*. In an aspect, the client access component 196 may execute transceiver 602 to scan each one of the plurality of available transmission resources 624 of the transmission window for the second RACH message 628. Accordingly, the client access component 196 may execute transceiver 602 to receive the second RACH message 628 on the transmission resource 624 based on scanning each of the plurality of available transmission resources 624 of the transmission window.

In an aspect, the client access component 196 may execute transceiver 602 to transmit the RACH preamble 626 with an indication of a transmission resource 624 selection from the plurality of available transmission resources 624 of the transmission window.

In an aspect, the client access component 196 may execute the determining component 630 to select a transmission resource 624 selection from a system-wide resource partitioning of a plurality of schedules corresponding to a plurality of remote devices. Accordingly, the client access component 196 may execute transceiver 602 to transmit a transmission resource 624 selection to the host UE 104*a*.

In an aspect, at least one of the RACH preamble 626 or a query message includes the transmission resource 624 selection, the query message being transmitted during a discovery procedure between the client UE 104*b* and the host UE 104*a*.

In an aspect, the client access component 196 may execute transceiver 602 to transmit a passive indication to the host UE 104*a* For example, the passive indication identifying availability of the client UE 104*b* for a reception of the second RACH message 628 on any of the plurality of transmission resource 624*s* of the transmission window. Additionally, at least one of the RACH preamble 626 or a query message includes the passive indication, the query message being transmitted during a discovery procedure between the client UE 104*b* and the host UE 104*a*.

In an aspect, the client access component 196 may execute transceiver 602 to receive a discovery signal during a discovery procedure from the host UE 104*a*. For example, the discovery signal including an indication of the transmission window comprising the plurality of available transmission resource 624*s* for the reception of the second RACH message 628 from the host UE 104*a*. Accordingly, the client access component 196 may execute transceiver 602 to transmit the RACH preamble 626 in response to receiving the discovery signal. In another aspect, the client access component 196 may execute transceiver 602 to transmit the RACH preamble 626 based on an out-of-band control network configuration.

In a further example, the transmission resource 624 corresponds to at least one of a transmission resource 624 number (RN) or a transmission offset time slot.

In a further example, the second RACH message 628 includes at least one of a transmit timing reference for the client UE 104*b*, an identifier (ID) for resolving any contentions between multiple remote devices, and resource configurations for one or more subsequent communications.

Referring to FIG. 6, one example of an implementation of UE 104 may include a variety of components, some of which have already been described above, but including components such as one or more processors 612 and memory 616 and transceiver 602 in communication via one or more buses 644, which may operate in conjunction with modem 614, host access component 194 and client access component 196 to enable one or more of the functions described herein related to discovery procedures for CV2X Further, the one or more processors 612, modem 614, memory 616, transceiver 602, RF front end 688 and one or more antennas 665, may be configured to support voice and/or data calls (simultaneously or non-simultaneously) in one or more radio access technologies.

In an aspect, the one or more processors 612 may include a modem 614 that uses one or more modem processors. The various functions related to host access component 194 and client access component 196 may be included in modem 614 and/or processors 612 and, in an aspect, may be executed by a single processor, while in other aspects, different ones of the functions may be executed by a combination of two or more different processors. For example, in an aspect, the one or more processors 612 may include any one or any combination of a modem processor, or a baseband processor, or a digital signal processor, or a transmit processor, or a receiver processor, or a transceiver processor associated with transceiver 602. In other aspects, some of the features of the one or more processors 612 and/or modem 614 associated with host access component 194 and client access component 196 may be performed by transceiver 602.

Also, memory 616 may be configured to store data used herein and/or local versions of applications 675, host access component 194, client access component 196 and/or one or more of subcomponents thereof being executed by at least one processor 612. Memory 616 may include any type of computer-readable medium usable by a computer or at least one processor 612, such as random access memory (RAM), read only memory (ROM), tapes, magnetic discs, optical discs, volatile memory, non-volatile memory, and any combination thereof. In an aspect, for example, memory 616 may be a non-transitory computer-readable storage medium that stores one or more computer-executable codes defining host access component 194, client access component 196 and/or one or more of subcomponents thereof, and/or data associated therewith, when UE 104 is operating at least one processor 612 to execute host access component 194 and client access component 196 and/or one or more subcomponents thereof.

Transceiver 602 may include at least one receiver 606 and at least one transmitter 608. Receiver 606 may include hardware, firmware, and/or software code executable by a processor for receiving data, the code comprising instructions and being stored in a memory (e.g., computer-readable medium). Receiver 606 may be, for example, a radio frequency (RF) receiver. In an aspect, receiver 606 may receive signals transmitted by at least one base station 102. Additionally, receiver 606 may process such received signals, and also may obtain measurements of the signals, such as, but not limited to, Ec/Io, SNR, RSRP, RSSI, etc. Transmitter 608 may include hardware, firmware, and/or software code executable by a processor for transmitting data, the code comprising instructions and being stored in a memory (e.g., computer-readable medium). A suitable example of transmitter 608 may including, but is not limited to, an RF transmitter.

Moreover, in an aspect, UE 104 may include RF front end 688, which may operate in communication with one or more antennas 665 and transceiver 602 for receiving and transmitting radio transmissions, for example, wireless communications transmitted by at least one base station 102 or wireless transmissions transmitted by UE 104. RF front end 688 may be connected to one or more antennas 665 and may include one or more low-noise amplifiers (LNAs) 690, one or more switches 692, one or more power amplifiers (PAs) 698, and one or more filters 696 for transmitting and receiving RF signals.

In an aspect, LNA 690 may amplify a received signal at a desired output level. In an aspect, each LNA 690 may have a specified minimum and maximum gain values. In an aspect, RF front end 688 may use one or more switches 692 to select a particular LNA 690 and its specified gain value based on a desired gain value for a particular application.

Further, for example, one or more PA(s) 698 may be used by RF front end 688 to amplify a signal for an RF output at a desired output power level. In an aspect, each PA 698 may have specified minimum and maximum gain values. In an aspect, RF front end 1088 may use one or more switches 692 to select a particular PA 698 and its specified gain value based on a desired gain value for a particular application.

Also, for example, one or more filters 696 may be used by RF front end 688 to filter a received signal to obtain an input RF signal. Similarly, in an aspect, for example, a respective filter 696 may be used to filter an output from a respective PA 698 to produce an output signal for transmission. In an aspect, each filter 696 may be connected to a specific LNA 690 and/or PA 698. In an aspect, RF front end 688 may use one or more switches 692 to select a transmit or receive path using a specified filter 696, LNA 690, and/or PA 698, based on a configuration as specified by transceiver 602 and/or processor 612.

As such, transceiver 602 may be configured to transmit and receive wireless signals through one or more antennas 665 via RF front end 688. In an aspect, transceiver may be tuned to operate at specified frequencies such that UE 104 may communicate with, for example, one or more base stations 102 or one or more cells associated with one or more base stations 102. In an aspect, for example, modem 614 may configure transceiver 602 to operate at a specified frequency and power level based on the UE configuration of the UE 104 and the communication protocol used by modem 614.

In an aspect, modem 614 may be a multiband-multimode modem, which may process digital data and communicate with transceiver 602 such that the digital data is sent and received using transceiver 602. In an aspect, modem 614 may be multiband and be configured to support multiple frequency bands for a specific communications protocol. In an aspect, modem 614 may be multimode and be configured to support multiple operating networks and communications protocols. In an aspect, modem 614 may control one or more components of UE 104 (e.g., RF front end 688, transceiver 602) to enable transmission and/or reception of signals from the network based on a specified modem configuration. In an aspect, the modem configuration may be based on the mode of the modem and the frequency band in use. In another aspect, the modem configuration may be based on UE configuration information associated with UE 104 as provided by the network during cell selection and/or cell reselection.

Referring to FIG. 7, one example of an implementation of base station 102 may include a variety of components, some of which have already been described above, but including components such as one or more processors 712 and memory 716 and transceiver 702 in communication via one or more buses 744, which may operate in conjunction with modem 714 and host access component 194 to enable one or more of the functions described herein related to CV2X discovery procedures.

The transceiver 702, receiver 706, transmitter 708, one or more processors 712, memory 716, applications 775, buses 744, RF front end 788, LNAs 790, switches 792, filters 796, PAs 798, and one or more antennas 765 may be the same as or similar to the corresponding components of UE 104, as described above, but configured or otherwise programmed for base station operations as opposed to UE operations.

It is understood that the specific order or hierarchy of blocks in the processes/flowcharts disclosed is an illustration of exemplary approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

What is claimed is:

1. A method of wireless communication, comprising:
   transmitting, by a second device, a discovery signal during a discovery procedure to a first device in response to receiving a query message from the first device, the discovery signal including an indication of a transmission resource associated with a second Random Access Channel (RACH) message and information corresponding to one or more services offered by the second device, wherein the query message indicates a request for additional information from the second device;
   receiving, at the second device, a RACH preamble corresponding to a first RACH message from the first device in response to transmitting the discovery signal, the RACH preamble initiates an access procedure between the first device and the second device;
   selecting, by the second device, the transmission resource included in the discovery signal and associated with the second RACH message based on the RACH preamble, wherein the second RACH message differs from the first RACH message; and
   transmitting, by the second device, the second RACH message on the selected transmission resource to the first device, wherein the second RACH message indicates one or more resources for the first device for transmitting a third RACH message.

2. The method of claim 1, wherein selecting the transmission resource associated with the second RACH message includes determining that the received RACH preamble corresponds to an acceptance of the transmission resource by the first device.

3. The method of claim 2, wherein determining that the received RACH preamble corresponds to the acceptance of the transmission resource by the first device includes determining that the received RACH preamble corresponds to the acceptance of the transmission resource by the first device based on an out-of-band control network configuration.

4. The method of claim 1, wherein selecting the transmission resource associated with the second RACH message includes determining the transmission resource from a transmission window comprising a plurality of available transmission resources for the transmission of the second RACH message.

5. The method of claim 4, wherein determining the transmission resource from the transmission window includes determining the transmission resource from the transmission window based on a transmission schedule for subsequent transmissions by the second device, and
   wherein the transmission schedule for subsequent transmissions by the second device includes at least one or both of subsequent RACH messages and subsequent non-RACH messages.

6. The method of claim 4, wherein the RACH preamble includes an indication of a transmission resource selection from the plurality of available transmission resources of the transmission window.

7. The method of claim 4, further comprising receiving, at the second device, a transmission resource selection from the first device, the transmission resource selection being selected from a system-wide resource partitioning of a plurality of schedules corresponding to a plurality of remote devices.

8. The method of claim 7, wherein at least one of the RACH preamble or a query message includes the transmission resource selection, the query message being received during the discovery procedure between the first device and the second device.

9. The method of claim 7, wherein selecting the transmission resource associated with the second RACH message includes determining whether to use the transmission resource selection or another of the plurality of available transmission resources of the transmission window for the transmission of the second RACH message based at least on one or more transmission parameters.

10. The method of claim 4, further comprising receiving, at the second device, a passive indication from the first device, the passive indication identifying availability of the first device for a reception of the second RACH message on any of the plurality of transmission resources of the transmission window, and
    wherein at least one of the RACH preamble or a query message includes the passive indication, the query message being received during the discovery procedure between the first device and the second device.

11. The method of claim 4, further comprising:
    transmitting, by the second device, the discovery signal during the discovery procedure to the first device, the discovery signal including an indication of the transmission window comprising the plurality of available transmission resources for the transmission of the second RACH message; and
    wherein receiving the RACH preamble from the first device includes receiving the RACH preamble in response to transmitting the discovery signal.

12. The method of claim 4, wherein determining the transmission resource from the transmission window includes determining the transmission resource from the transmission window based on an out-of-band control network configuration.

13. The method of claim 1, wherein the transmission resource corresponds to at least one of a transmission resource number (RN) or a transmission offset time slot.

14. The method of claim 1, wherein the second RACH message includes at least one of a transmit timing reference for the first device, an identifier (ID) for resolving any contentions between multiple remote devices, and resource configurations for one or more subsequent communications.

15. The method of claim 1, wherein transmitting the discovery signal further comprises beamforming the discovery signal based on the query message.

16. A method of wireless communications, comprising:
receiving, by a first device, a discovery signal during a discovery procedure from a second device in response to transmitting a query message to the second device, the discovery signal including an indication of a transmission resource associated with a second Random Access Channel (RACH) message, wherein the query message indicates a request for additional information from the second device;
transmitting, by the first device, a RACH preamble corresponding to a first RACH message to the second device in response to receiving the discovery signal, the RACH preamble initiates an access procedure between the first device and the second device; and
scanning, at the first device, for the second RACH message on the transmission resource included in the discovery signal from the second device based on transmitting the RACH preamble, wherein the second RACH message differs from the first RACH message, and wherein the second RACH message indicates one or more resources for the first device for transmitting a third RACH message.

17. The method of claim 16, further comprising:
determining, at the first device, whether the transmission resource is available for reception of the second RACH message from the second device; and
wherein transmitting the RACH preamble to the second device includes transmitting the RACH preamble based on a determination that the transmission resource is available for the reception of the second RACH message from the second device, the RACH preamble corresponding an acceptance of the transmission resource by the first device.

18. The method of claim 17, wherein determining whether the transmission resource is available for the reception of the second RACH message from the second device includes determining the transmission resource of the second RACH message from the second device based on an out-of-band control network configuration.

19. The method of claim 16, wherein the transmission resource corresponds to one of a plurality of available transmission resources of a transmission window for reception of the second RACH message from the second device.

20. The method of claim 19, wherein scanning for the second RACH message on the transmission resource includes scanning each of the plurality of available transmission resources of the transmission window.

21. The method of claim 19, wherein transmitting the RACH preamble to the second device includes transmitting the RACH preamble with an indication of a transmission resource selection from the plurality of available transmission resources of the transmission window.

22. The method of claim 19, further comprising:
selecting a transmission resource selection from a system-wide resource partitioning of a plurality of schedules corresponding to a plurality of remote devices; and
transmitting, by the first device, the transmission resource selection to the second device, and
wherein at least one of the RACH preamble or a query message includes the transmission resource selection, the query message being transmitted during the discovery procedure between the first device and the second device.

23. The method of claim 19, further comprising transmitting, by the first device, a passive indication to the second device, the passive indication identifying availability of the first device for a reception of the second RACH message on any of the plurality of transmission resources of the transmission window, and
wherein at least one of the RACH preamble or a query message includes the passive indication, the query message being transmitted during the discovery procedure between the first device and the second device.

24. The method of claim 19, further comprising:
receiving, by the first device, the discovery signal during the discovery procedure from the second device, the discovery signal including an indication of the transmission window comprising the plurality of available transmission resources for the reception of the second RACH message from the second device; and
wherein transmitting the RACH preamble to the second device includes transmitting the RACH preamble in response to receiving the discovery signal.

25. The method of claim 19, wherein transmitting the RACH preamble to the second device includes transmitting the RACH preamble based on an out-of-band control network configuration.

26. The method of claim 16, wherein the transmission resource corresponds to at least one of a transmission resource number (RN) or a transmission offset time slot.

27. The method of claim 16, wherein the second RACH message includes at least one of a transmit timing reference for the first device, an identifier (ID) for resolving any contentions between multiple remote devices, and resource configurations for one or more subsequent communications.

28. The method of claim 16, wherein transmitting the RACH preamble further comprises transmitting the RACH preamble on preconfigured discovery resources instead of a dedicated RACH physical channel.

29. The apparatus of claim 16, wherein the processor configured to transmit the RACH preamble is further configured to transmit the RACH preamble on preconfigured discovery resources instead of a dedicated RACH physical channel.

30. An apparatus for wireless communications, comprising:
a memory; and
a processor coupled with the memory and configured to:
transmit, by a second device, a discovery signal during a discovery procedure to a first device in response to receiving a query message from the first device, the discovery signal including an indication of a transmission resource associated with a second Random Access Channel (RACH) message and information corresponding to one or more services offered by the second device, wherein the query message indicates a request for additional information from the second device;
receive, at the second device, a RACH preamble corresponding to a first RACH message from the first device in response to transmitting the discovery signal, the RACH preamble initiates an access procedure between the first device and the second device;
select, by the second device, the transmission resource included in the discovery signal and associated with the second RACH message based on the RACH preamble, wherein the second RACH message differs from the first RACH message; and
transmit, by the second device, the second RACH message on the selected transmission resource to the first device, wherein the second RACH message indicates one or more resources for the first device for transmitting a third RACH message.

31. The apparatus of claim 30, wherein the processor configured to select the transmission resource associated with the second RACH message is further configured to determine that the received RACH preamble corresponds to an acceptance of the transmission resource by the first device.

32. The apparatus of claim 31, wherein the processor configured to determine that the received RACH preamble corresponds to the acceptance of the transmission resource by the first device is further configured to determine that the received RACH preamble corresponds to the acceptance of the transmission resource by the first device based on an out-of-band control network configuration.

33. The apparatus of claim 30, wherein the processor configured to select the transmission resource associated with the second RACH message is further configured to determine the transmission resource from a transmission window comprising a plurality of available transmission resources for the transmission of the second RACH message.

34. The apparatus of claim 33, wherein the processor configured to determine the transmission resource from the transmission window is further configured to determine the transmission resource from the transmission window based on a transmission schedule for subsequent transmissions by the second device, and
wherein the transmission schedule for subsequent transmissions by the second device includes at least one or both of subsequent RACH messages and subsequent non-RACH messages.

35. The apparatus of claim 33, wherein the RACH preamble includes an indication of a transmission resource selection from the plurality of available transmission resources of the transmission window.

36. The apparatus of claim 33, wherein the processor is configured to receive, at the second device, a transmission resource selection from the first device, the transmission resource selection being selected from a system-wide resource partitioning of a plurality of schedules corresponding to a plurality of remote devices.

37. The apparatus of claim 36, wherein at least one of the RACH preamble or a query message includes the transmission resource selection, the query message being received during the discovery procedure between the first device and the second device.

38. The apparatus of claim 36, wherein the processor configured to select the transmission resource associated with the second RACH message is further configured to determine whether to use the transmission resource selection or another of the plurality of available transmission resources of the transmission window for the transmission of the second RACH message based at least on one or more transmission parameters.

39. The apparatus of claim 33, wherein the processor is configured to receive, at the second device, a passive indication from the first device, the passive indication identifying availability of the first device for a reception of the second RACH message on any of the plurality of transmission resources of the transmission window, and
wherein at least one of the RACH preamble or a query message includes the passive indication, the query message being received during the discovery procedure between the first device and the second device.

40. The apparatus of claim 33, wherein the processor is configured to transmit, by the second device, the discovery signal during the discovery procedure to the first device, the discovery signal including an indication of the transmission window comprising the plurality of available transmission resources for the transmission of the second RACH message; and
wherein the processor configured to receive the RACH preamble from the first device is further configured to receive the RACH preamble in response to transmitting the discovery signal.

41. The apparatus of claim 33, wherein the processor configured to determine the transmission resource from the transmission window is further configured to determine the transmission resource from the transmission window based on an out-of-band control network configuration.

42. The apparatus of claim 30, wherein the transmission resource corresponds to at least one of a transmission resource number (RN) or a transmission offset time slot.

43. The apparatus of claim 30, wherein the second RACH message includes at least one of a transmit timing reference for the first device, an identifier (ID) for resolving any contentions between multiple remote devices, and resource configurations for one or more subsequent communications.

44. The apparatus of claim 30, wherein the processor configured to transmit the discovery signal is further configured to beamform the discovery signal based on the query message.

45. An apparatus for wireless communications, comprising:
a memory; and
a processor coupled with the memory and configured to:
receive, by a first device, a discovery signal during a discovery procedure from a second device in response to transmitting a query message to the second device, the discovery signal including an indication of a transmission resource associated with a second Random Access Channel (RACH) message, wherein the query message indicates a request for additional information from the second device;
transmitting, by the first device, a RACH preamble corresponding to a first RACH message to the second device in response to receiving the discovery signal, the RACH preamble initiates an access procedure between the first device and the second device; and
scanning, at the first device, for the second RACH message on the transmission resource included in the discovery signal from the second device based on transmitting the RACH preamble, wherein the second RACH message differs from the first RACH message, and wherein the second RACH message indicates one or more resources for the first device for transmitting a third RACH message.

46. The apparatus of claim 45, wherein the processor is further configured to determine, at the first device, whether the transmission resource is available for reception of the second RACH message from the second device; and wherein the processor configured to transmit the RACH preamble to the second device is further configured to transmit the RACH preamble based on a determination that the transmission resource is available for the reception of the second RACH message from the second device, the RACH preamble corresponding an acceptance of the transmission resource by the first device.

47. The apparatus of claim 46, wherein the processor configured to determine whether the transmission resource is available for the reception of the second RACH message from the second device is further configured to determine the transmission resource of the second RACH message from the second device based on an out-of-band control network configuration.

48. The apparatus of claim 45, wherein the transmission resource corresponds to one of a plurality of available transmission resources of a transmission window for reception of the second RACH message from the second device.

49. The apparatus of claim 48, wherein the processor configured to scan for the second RACH message on the transmission resource is further configured to scan each of the plurality of available transmission resources of the transmission window.

50. The apparatus of claim 48, wherein the processor configured to transmit the RACH preamble to the second device is further configured to transmit the RACH preamble with an indication of a transmission resource selection from the plurality of available transmission resources of the transmission window.

51. The apparatus of claim 48, wherein the processor is configured to:

select a transmission resource selection from a system-wide resource partitioning of a plurality of schedules corresponding to a plurality of remote devices; and transmit, by the first device, the transmission resource selection to the second device, and wherein at least one of the RACH preamble or a query message includes the transmission resource selection, the query message being transmitted during the discovery procedure between the first device and the second device.

52. The method of claim 48, wherein the processor is configured to transmit, by the first device, a passive indication to the second device, the passive indication identifying availability of the first device for a reception of the second RACH message on any of the plurality of transmission resources of the transmission window, and wherein at least one of the RACH preamble or a query message includes the passive indication, the query message being transmitted during the discovery procedure between the first device and the second device.

53. The apparatus of claim 48, wherein the processor is configured to receive, by the first device, the discovery signal during the discovery procedure from the second device, the discovery signal including an indication of the transmission window comprising the plurality of available transmission resources for the reception of the second RACH message from the second device; and wherein the processor configured to transmit the RACH preamble to the second device is further configured to transmit the RACH preamble in response to receiving the discovery signal.

54. The apparatus of claim 48, wherein the processor configured to transmit the RACH preamble to the second device is further configured to transmit the RACH preamble based on an out-of-band control network configuration.

55. The apparatus of claim 45, wherein the transmission resource corresponds to at least one of a transmission resource number (RN) or a transmission offset time slot.

56. The apparatus of claim 45, wherein the second RACH message includes at least one of a transmit timing reference for the first device, an identifier (ID) for resolving any contentions between multiple remote devices, and resource configurations for one or more subsequent communications.

57. A non-transitory computer-readable medium for wireless communication, comprising code executable by one or more processors to:

transmit, by a second device, a discovery signal during a discovery procedure to a first device in response to receiving a query message from the first device, the discovery signal including an indication of a transmission resource associated with a second Random Access Channel (RACH) message and information corresponding to one or more services offered by the second device, wherein the query message indicates a request for additional information from the second device;

receive, at the second device, a RACH preamble corresponding to a first RACH message from the first device in response to transmitting the discovery signal, the RACH preamble initiates an access procedure between the first device and the second device;

select, by the second device, the transmission resource included in the discovery signal and associated with the second RACH message based on the RACH preamble, wherein the second RACH message differs from the first RACH message; and transmit, by the second device, the second RACH message on the selected transmission resource to the first device, wherein the second RACH message indicates one or more resources for the first device for transmitting a third RACH message.

58. An apparatus for wireless communication, comprising:

means for transmitting, by a second device, a discovery signal during a discovery procedure to a first device in response to receiving a query message from the first device, the discovery signal including an indication of a transmission resource associated with a second Random Access Channel (RACH) message and information corresponding to one or more services offered by the second device, wherein the query message indicates a request for additional information from the second device;

means for receiving, at the second device, a RACH preamble corresponding to a first RACH message from the first device in response to transmitting the discovery signal, the RACH preamble initiates an access procedure between the first device and the second device;

means for selecting, by the second device, the transmission resource included in the discovery signal and associated with the second RACH message based on the RACH preamble, wherein the second RACH message differs from the first RACH message; and means for transmitting, by the second device, the second RACH message on the selected transmission resource to the first device, wherein the second RACH message indicates one or more resources for the first device for transmitting a third RACH message.

59. A non-transitory computer-readable medium for wireless communication, comprising code executable by one or more processors to:
- receive, by a first device, a discovery signal during a discovery procedure from a second device in response to transmitting a query message to the second device, the discovery signal including an indication of a transmission resource associated with a second Random Access Channel (RACH) message, wherein the query message indicates a request for additional information from the second device;
- transmitting, by the first device, a RACH preamble corresponding to a first RACH message to the second device in response to receiving the discovery signal, the RACH preamble initiates an access procedure between the first device and the second device; and
- scanning, at the first device, for the second RACH message on the transmission resource included in the discovery signal from the second device based on transmitting the RACH preamble, wherein the second RACH message differs from the first RACH message, and wherein the second RACH message indicates one or more resources for the first device for transmitting a third RACH message.

60. An apparatus for wireless communication, comprising:
- means for receiving, by a first device, a discovery signal during a discovery procedure from a second device in response to transmitting a query message to the second device, the discovery signal including an indication of a transmission resource associated with a second Random Access Channel (RACH) message, wherein the query message indicates a request for additional information from the second device;
- means for transmitting, by the first device, a RACH preamble corresponding to a first RACH message to the second device in response to receiving the discovery signal, the RACH preamble initiates an access procedure between the first device and the second device; and
- means for scanning, at the first device, for the second RACH message on the transmission resource included in the discovery signal from the second device based on transmitting the RACH preamble, wherein the second RACH message differs from the first RACH message, and wherein the second RACH message indicates one or more resources for the first device for transmitting a third RACH message.

\* \* \* \* \*